United States Patent [19]
Winkler

[11] Patent Number: 5,156,859
[45] Date of Patent: Oct. 20, 1992

[54] APPARATUS FOR BENDING A LAMINATED PLASTIC SHEET

[76] Inventor: Karl Winkler, Industriestr. 1+2, D-4408 Dülmen, Fed. Rep. of Germany

[21] Appl. No.: 623,916

[22] PCT Filed: Apr. 4, 1990

[86] PCT No.: PCT/DE90/00264
§ 371 Date: Feb. 8, 1991
§ 102(e) Date: Feb. 8, 1991

[87] PCT Pub. No.: WO90/11882
PCT Pub. Date: Oct. 18, 1990

[30] Foreign Application Priority Data
Apr. 12, 1989 [EP] European Pat. Off. ........ 89106495.8

[51] Int. Cl.⁵ .............................................. B29C 53/04
[52] U.S. Cl. .................................... 425/194; 156/486; 264/295; 264/322; 264/339; 425/374; 425/394
[58] Field of Search .................. 264/295, 322, 339; 425/374, 394, 194; 156/216, 486

[56] References Cited

U.S. PATENT DOCUMENTS

| | | | |
|---|---|---|---|
| 3,009,201 | 11/1961 | Hansen | 18/19 |
| 3,392,074 | 7/1968 | Bartron | 156/216 |
| 4,334,947 | 6/1982 | Zaino | 156/486 |
| 4,756,863 | 7/1988 | Petershofer | 264/339 X |
| 4,777,005 | 10/1988 | Miller | 264/339 |

FOREIGN PATENT DOCUMENTS 349766 4/1979 Austria .
0141604 5/1985 European Pat. Off. .
WO8602314 4/1986 World Int. Prop. O. .

Primary Examiner—Jan H. Silbaugh
Assistant Examiner—Brian J. Eastley
Attorney, Agent, or Firm—Peter K. Kontler

[57] ABSTRACT

An apparatus for bending a laminated thermoplastic sheet without displacing the lamina relative to one another includes a clamp which functions to hold the sheet during the bending procedure. A support is disposed adjacent the clamp and has a curved surface for forming a bend in the sheet and a flat surface which constitutes an abutment for the part of the sheet being bent. The support is adjustable to vary the angle of bending. A bending device for the sheet comprises a carriage having a bending roller, and a ram whose size approximates that of the flat abutment surface. The sheet is clamped with a portion thereof projecting freely above the flat abutment surface and heated. The bending roller thereupon forces the sheet against the curved surface to bend the sheet and then moves across the projecting portion of the sheet to urge such portion into engagement with the flat abutment surface. Once the roller has completed its travel across the projecting portion of the sheet, the ram is applied to the projecting portion and holds it against the flat abutment surface until the sheet is cooled. The carriage is guided in a track having two sections of which one is parallel to and adjustable with the support.

10 Claims, 3 Drawing Sheets

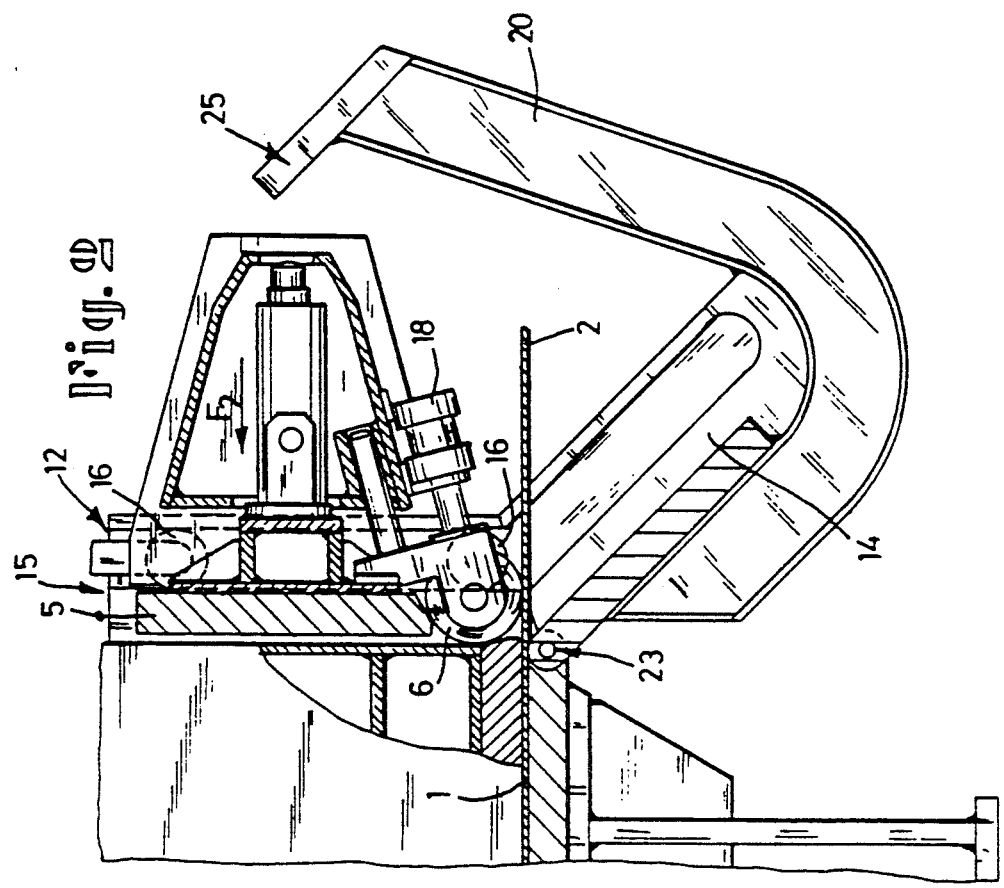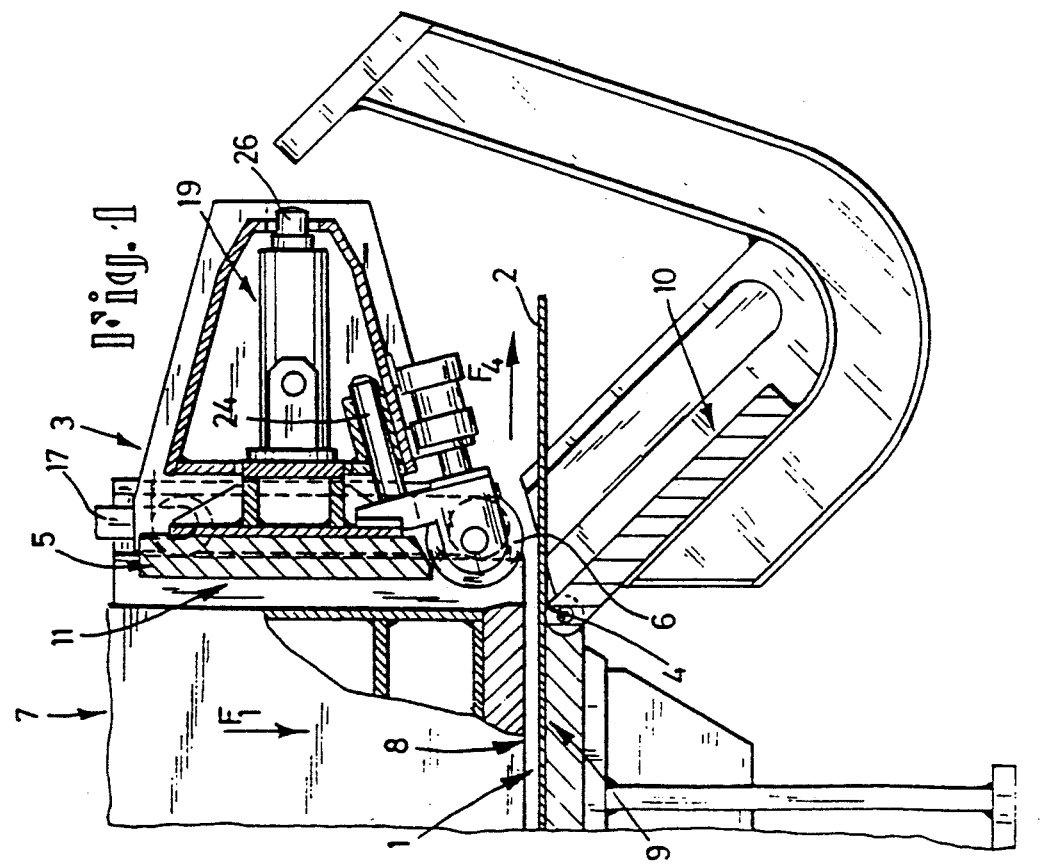

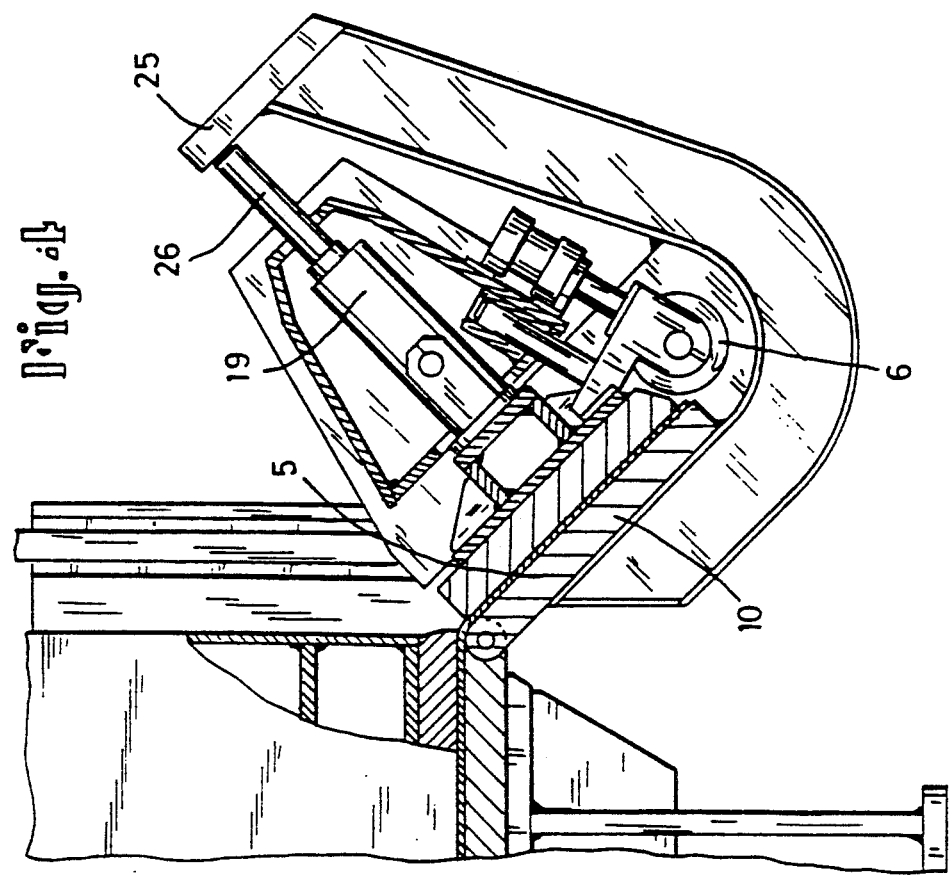
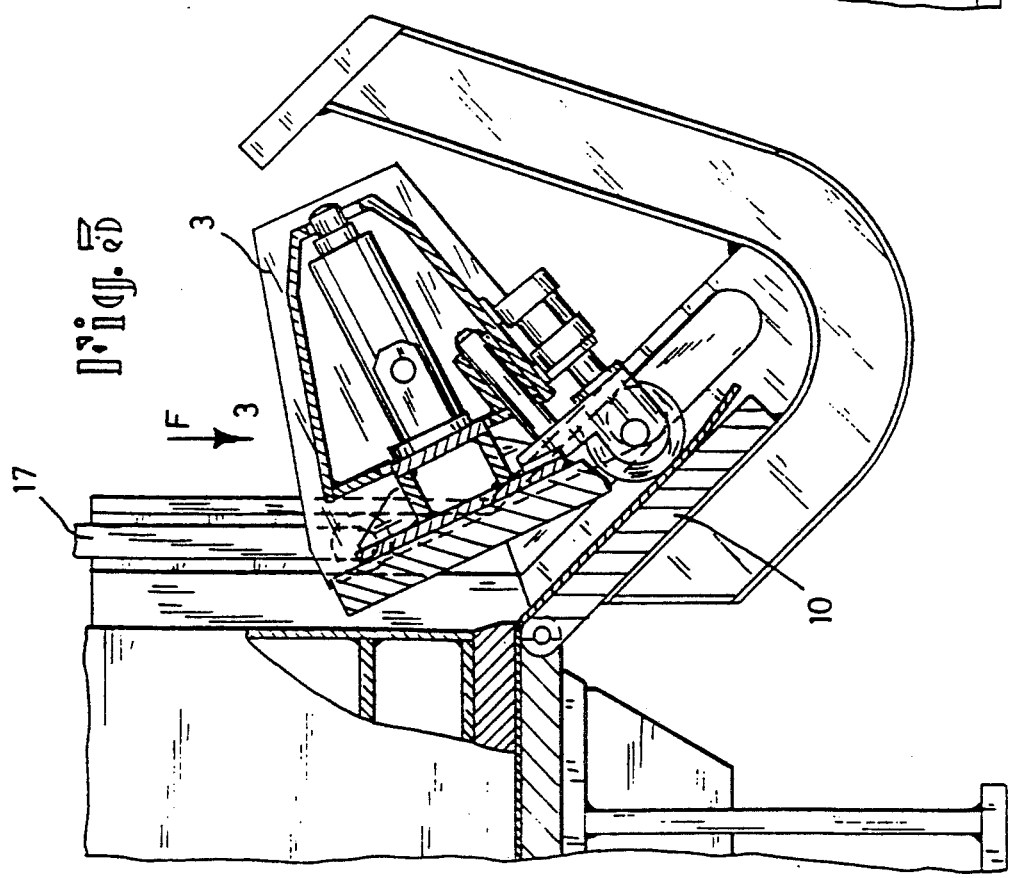

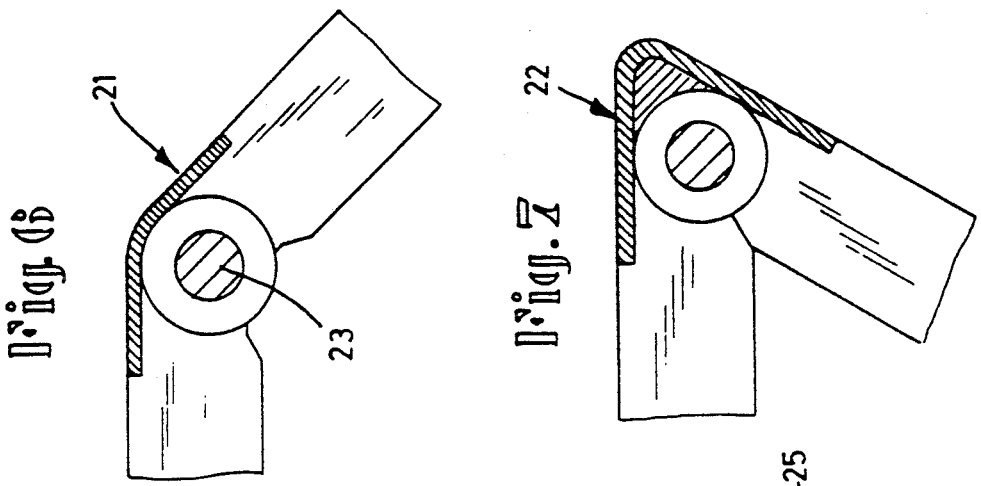
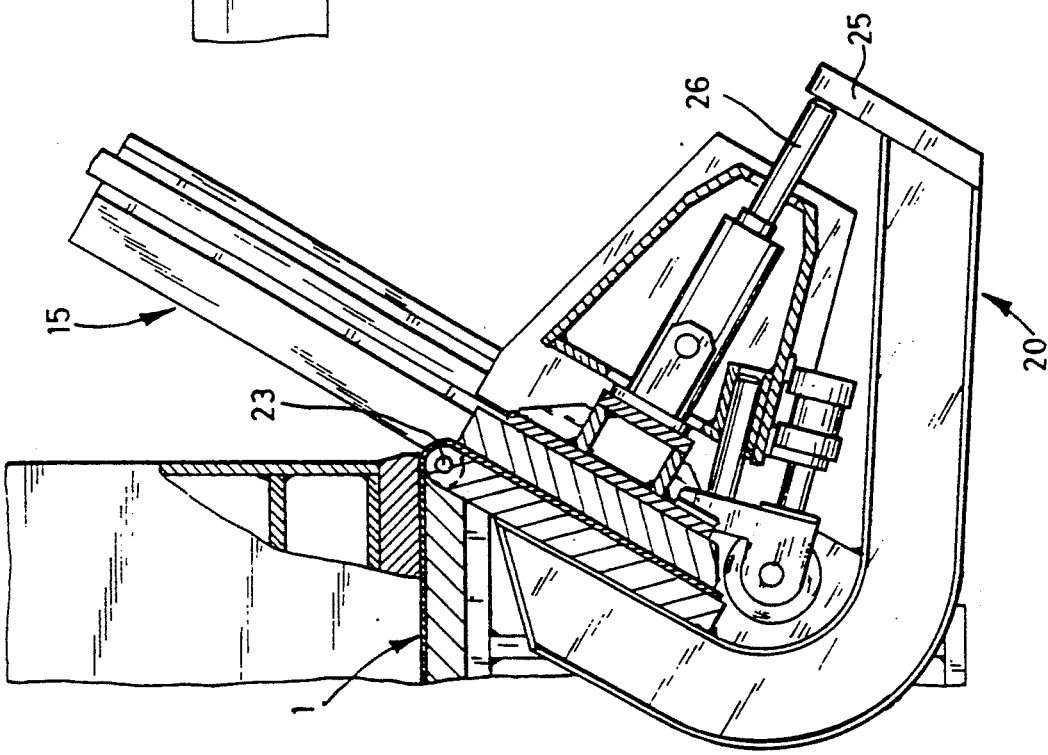

APPARATUS FOR BENDING A LAMINATED PLASTIC SHEET

BACKGROUND OF THE INVENTION

The invention relates to a method of thermoforming a laminated plastic sheet and to a device for bending thermoplastic laminated plastic sheets.

A method of shaping a laminated plastic sheet is known from the Austrian patent 349 766. In this known method, the region of the sheet to be bent is heated and the sheet is thereupon bent, around a mandrel if necessary, in a bending device. Here, the individual lamellae of the sheet shift relative to one another. Elements serving for shape retention then hold the bent component until the thermoplastic has hardened.

This known method employs a bending toggle which carries a bending plate and is pivoted about a bending mandrel. The bending plate is in constant surface-to-surface contact with the marginal sheet portion to be bent and slides relative to the surface thereof. This sliding motion over a large area is undesired. Since the bending plate lies against the sheet to be bent via an antifriction liner to avoid damage to the surface of the sheet, this bending device cannot hold the bent sheet until the sheet has hardened. Accordingly, a shape retention device is additionally required. The shape retention device includes a pressing die having a concave cylindrical pressing surface which, after the bending procedure, is pressed against the convex surface of the bent sheet portion. This pressing die must be different for each bending radius. Therefore, even the holder of the Austrian patent 349 766 considers the method and device of the patent to be capable of improvement.

A method of this type is known from WO 86/02314. In this known method, the bending device is again in surface-to-surface contact with the marginal sheet portion to be bent throughout at least a large part of the bending procedure. As a result, an undesired shifting of the layers relative to one another occurs at the actual bending location of the sheet to be bent because the bending load is applied far from this actual bending location.

In the device known from the generic WO 86/02314, the pressing member is mounted strictly for up-and-down movement so that only bends of 90 degrees can be obtained, i.e., the method can only be applied to sheets whose margins are to be bent 90 degrees.

OBJECTS AND SUMMARY OF THE INVENTION

It is an object of the invention to improve the known method in such a manner that the actual bending load is uniformly applied to the marginal sheet portion to be bent during the entire bending procedure. A pull towards the free sheet margin is to be exerted on the laminate layers while this bending load is applied so that the sheet is rigidly stressed at the actual bending location.

Another object of the invention is to improve the generic device such that a sheet can be bent in any manner. A single operating device is to contain the arrangement which initiates and performs the bending procedure and such arrangement is to simultaneously exert a pull on the sheet layers to be bent and, following the bending procedure, apply an areal load to the bent section.

BRIEF DESCRIPTION OF THE DRAWING

FIGS. 1 to 4 show a bending device during bending,
FIG. 5 shows a different position of the bending device,
FIGS. 6 and 7 show the region of the bending location of the device according to the invention on a greatly enlarged scale to clarify the design of such region.

DESCRIPTION OF PREFERRED EMBODIMENTS

In the drawings 1 denotes a laminated plastic sheet to be bent. The sheet 1 is of a type known per se and is made up of several thermoplastic laminate layers. Layers composed of thermoplastic binders are interposed between these laminate layers.

The sheet 1 rests in a clamping device 7 which defines an upper clamping surface 8 and a lower clamping surface 9. The free marginal sheet portion 2 of the sheet 1, which is to be bent, projects beyond the upper and lower clamping surfaces in the direction of the arrow F4. In the illustrated exemplary embodiment, the sheet 1 is to be bent approximately 45 degrees in the region of a curved reaction surface 4. The lower clamping surface 9 continues as a so-called load reaction surface 10 which is pivotally connected to the lower clamping surface 9 at 23 so that the load reaction surface 10 can be set at the desired bending angle.

The upper clamping surface 8 can be firmly applied against the sheet 1, and thus against the lower clamping surface 9, by hydraulic, pneumatic and/or mechanical means not illustrated in the drawing to thereby fix the sheet 1 to be processed.

A bending device 3 is further provided and consists essentially of a pressing ram 5 having a lower loading surface 11, and a loading roller 6 which is of one piece with the pressing ram 5 and is vertically adjacent to the sheet 1. The pressing ram 5 is located vertically above and adjoins the loading roller 6. The pressing ram 5 and the loading roller 6, which can be arrestable if necessary, can be moved towards the clamping device 7 by a hydraulic or pneumatic piston-and-cylinder unit 18 which can, for example, be supported on the housing of the bending device 3. Preferably, the pressing ram 5 and the loading roller 6 are then guided via a guide 24 in the interior of the housing of the bending device 3. Adjustment takes place at an inclination to the surface so that, under final load, a pull is exerted on the plastic sheet.

The bending device 3 itself is guided in a carriage guide 12 which is divided into two parts, namely, an upper part 15 and a lower part 14. As shown particularly clearly in FIG. 1, the two parts can make an angle with one another in that the lower part 14 of the carriage guide 12 carries the load reaction surface 10 which is pivotally connected to the clamping surface 9 at 23.

The lower part 14 of the carriage guide 12 has a reaction abutment 20 which surrounds the lower carriage guide and is provided with a load reaction plate 25. A loading piston 26 of a hydraulic piston-and-cylinder unit 19, which is located in the interior of the bending device 3 and is likewise connected to the pressing ram 5, can be applied against the load reaction plate 25.

The bending device 3 has rollers 16 which support and guide it in the carriage guide 12. The entire bending device 3 is equipped with a connecting part 17 which leads to a loading unit for moving the bending device 3 up-and-down.

The effect and operation of this arrangement are as follows:

In FIG. 1, the arrangement is in its starting position, i.e., the sheet 1 rests on the lower clamping surface 9, the upper clamping surface 8 has not yet been moved down to fix the sheet 1 and the bending device 3 is in a starting rest position.

FIG. 2 shows that the upper clamping surface 8 has been moved downwards in the direction of the arrow F1 of FIG. 1 thereby fixing the sheet 1 and that the pressing ram 5 and the loading roller 6 were subsequently moved forwards in the direction of the arrow F2 by activating the hydraulic piston-and-cylinder unit 18. The loading roller 6 is now situated very near the bending location, i.e., the curved reaction surface 4. The loading roller 6 generates a loading line which, for instance, is transverse to the longitudinal direction F4 and the generatrix of the curved reaction surface 4.

According to FIG. 3, a load has been exerted on the bending device 3 via the connecting part 17 so that the bending device 3 has moved downwards in the direction of the arrow F3 in FIG. 3. The loading roller 6 has thus lowered the marginal sheet portion 2, which is still freely projecting in FIG. 2, onto the load reaction surface 10. Not only is a load then applied perpendicular to the load reaction surface 10 but, at the same time, a pull is exerted on the marginal sheet portion 2 towards the free sheet margin. This occurs because the sheet 1 arched up in front of the loading roller 6 and because, under certain circumstances, the loading roller 6 presses somewhat into the sheet 1.

In the operating position of FIG. 4, bending of the free marginal sheet portion 2 has been completed. By pressurizing the hydraulic piston-and-cylinder arrangement 19, the loading piston 26 has now been extended and comes into engagement with the abutment surface 25. A corresponding pressure is accordingly exerted, via the pressing ram 5, on the surface of the marginal sheet portion to be bent until the sheet 1 has cooled at this location and the desired hardening of the laminated plastic sheet has taken place.

It is clear from FIG. 4 that the pressing roller 6 now has no function and is free.

It can be seen from the illustration in FIG. 5 that bending angles greater than 90 degrees can be obtained with the arrangement according to the invention, i.e., an angle smaller than 90 degrees exists between the underside of the sheet 1 and the marginal sheet portion 2 to be bent.

FIG. 6 shows a feature of the arrangement in accordance with the invention, namely, the provision of inserts 21 and 22 which are disposed in the region of the curved reaction surface 4 and bear against the underside of the sheet 1 in the area of the bend. It is seen that different inserts 21 and 22 can be stored depending upon the bending angle and the bending radius so that a conversion of the machine from one bending angle to another can be performed rapidly and without problem.

I claim:

1. An apparatus for forming a laminated sheet, comprising means for clamping the sheet during forming; means for supporting the sheet, said supporting means being provided with a bent surface for bending the sheet and an abutment surface which defines a predetermined bending angle; means for bending the sheet, said bending means including a carriage, a first member on said carriage for urging the sheet against said surfaces to thereby bend the sheet, a second member on said carriage for holding the sheet against said abutment surface following bending of the sheet, and means for urging said second member against said abutment surface, said urging means including a piston-and-cylinder unit; means for guiding the carriage, said guiding means including a track having a section which is substantially parallel to said abutment surface, and said section and said abutment surface being adjustable to vary the angle of bending; and an abutment fast with said track, said abutment being engageable by said piston-and-cylinder unit to thereby urge said second member against said abutment surface.

2. The apparatus of claim 1, wherein said clamping means is provided with a pair of substantially flat clamping surfaces.

3. The apparatus of claim 1, wherein said bent surface and said abutment surface are substantially in register with one another, said clamping means being provided with a clamping surface which is inclined to said abutment surface and is substantially in register with said bent surface and said abutment surface.

4. The apparatus of claim 1, wherein said first member comprises a roller and said second member comprises a plate.

5. The apparatus of claim 1, wherein said first and second members are constructed as a unit.

6. The apparatus of claim 1, wherein said track has another section which is adjustable about an axis substantially paralleling said surfaces.

7. The apparatus of claim 1, wherein said carriage is provided with rollers which engage said track; and further comprising means for displacing said carriage along said track.

8. The apparatus of claim 1, wherein said piston-and-cylinder unit is hydraulic.

9. The apparatus of claim 1, wherein said bent surface is defined by a removable insert having a predetermined radius.

10. The apparatus of claim 9, further comprising additional inserts having radii different from said predetermined radius.

* * * * *